US005951078A

United States Patent [19]

Whitehead et al.

[11] Patent Number: 5,951,078

[45] Date of Patent: Sep. 14, 1999

[54] EXPANDABLE SNOW TOOLS FOR VEHICLES

[75] Inventors: Stephen P. Whitehead, Elgin; Michael R. Vogler; Torrence C. Anderson, both of Aurora, all of Ill.

[73] Assignee: Suncast Corporation, Batavia, Ill.

[21] Appl. No.: 08/944,230

[22] Filed: Oct. 6, 1997

[51] Int. Cl.$^{6}$ .................................. A01B 1/22; E01H 5/02

[52] U.S. Cl. .............................................. 294/54.5; 294/57

[58] Field of Search ............................... 294/49, 51, 54.5, 294/55–59; 16/110 R, 111 R, 114 R, 115, 116 R, 119, 125; 37/241, 265, 268, 278, 284, 285; D8/10, 300, 303

[56] References Cited

U.S. PATENT DOCUMENTS

| | | | |
|---|---|---|---|
| D. 213,630 | 3/1969 | Hoxie | D8/1 |
| D. 214,662 | 7/1969 | Portz | D8/10 |
| D. 257,210 | 10/1980 | Bonnes | D8/10 |
| D. 267,468 | 1/1983 | Simms | D8/10 |
| D. 269,490 | 6/1983 | Germain | D8/1 |
| D. 284,733 | 7/1986 | Hozumi | D8/10 |
| D. 291,863 | 9/1987 | Kolonia | D8/10 |
| D. 296,410 | 6/1988 | Abbott | D8/10 |
| D. 306,962 | 4/1990 | Schuele | D8/13 |
| D. 328,553 | 8/1992 | Norton et al. | D8/10 |
| D. 331,652 | 12/1992 | Wu | D34/27 |
| D. 350,166 | 8/1994 | Kino | D21/120 |
| D. 360,564 | 7/1995 | Tisbo et al. | D8/10 |
| D. 363,653 | 10/1995 | Tisbo et al. | D8/10 |
| 366,099 | 7/1887 | Hinchman . | |
| D. 384,559 | 10/1997 | Tisbo et al. | D8/10 |
| D. 384,866 | 10/1997 | Tisbo et al. | D8/10 |
| D. 385,160 | 10/1997 | Tisbo et al. | D8/10 |
| D. 390,431 | 2/1998 | Whitehead et al. . | |
| D. 392,520 | 3/1998 | Tisbo et al. . | |
| D. 392,521 | 3/1998 | Tisbo et al. . | |
| D. 393,990 | 5/1998 | Whitehead et al. . | |
| D. 393,991 | 5/1998 | Tisbo et al. . | |
| 678,373 | 7/1901 | Blaser . | |
| 808,992 | 1/1906 | Lawson | 294/57 |
| 864,338 | 8/1907 | Schertzer . | |
| 930,660 | 8/1909 | Gifford . | |
| 964,453 | 7/1910 | Robarge . | |
| 967,270 | 8/1910 | Tiedt . | |
| 1,042,352 | 10/1912 | Kohler . | |
| 1,260,276 | 3/1918 | Miller . | |
| 1,267,915 | 5/1918 | Shellabarger | 294/57 |
| 1,435,061 | 11/1922 | Halsey . | |
| 1,839,285 | 1/1932 | Winkie . | |

(List continued on next page.)

FOREIGN PATENT DOCUMENTS

| | | | |
|---|---|---|---|
| 234243 | 12/1959 | Australia . | |
| 2285163 | 4/1976 | France . | |
| 641210 | 8/1933 | Germany . | |
| 687817 | 1/1940 | Germany . | |
| 369590 | 3/1939 | Italy . | |
| 87623 | 10/1936 | Sweden | 294/57 |
| 18737 | of 1906 | United Kingdom | 294/57 |
| 1009947 | 11/1965 | United Kingdom . | |
| 1173714 | 12/1969 | United Kingdom . | |
| 1424565 | 2/1976 | United Kingdom . | |
| 2063142 | 6/1981 | United Kingdom . | |

*Primary Examiner*—Johnny D. Cherry
*Attorney, Agent, or Firm*—Welsh & Katz, Ltd.

[57] ABSTRACT

A telescoping snow tool can be conveniently retracted for compact storage in vehicles and can be easily extended for use in shoveling and removing snow or ice. The comfortable telescoping snow tool can have an outer composite shaft with a manually grippable, thermally insulating sleeve that encloses a tubular metal core into which slides an inner shaft. The inner shaft can comprise a metal tube with a protective coating. The telescoping snow tool can have a handgrip and a blade, such as a lightweight plastic snow shovel blade.

20 Claims, 3 Drawing Sheets

U.S. PATENT DOCUMENTS

| | | | |
|---|---|---|---|
| 1,931,349 | 10/1933 | Habig . | |
| 2,047,485 | 7/1936 | McBrady | 294/57 |
| 2,085,382 | 6/1937 | Nebor | 294/54.5 |
| 2,529,342 | 11/1950 | Kopplin et al. | 294/57 |
| 3,119,596 | 1/1964 | Pratt | 254/131.5 |
| 3,177,026 | 4/1965 | Cowan | 294/54.5 |
| 3,226,149 | 12/1965 | McJohnson | 294/57 X |
| 3,680,641 | 8/1972 | Hein | 172/371 |
| 4,149,744 | 4/1979 | Bonnes | 294/54.5 |
| 4,247,141 | 1/1981 | Grint | 294/49 |
| 4,280,727 | 7/1981 | Germain | 294/54.5 |
| 4,538,847 | 9/1985 | Lapshansky | 294/51 |
| 4,655,494 | 4/1987 | Eads et al. | 294/49 |
| 4,690,447 | 9/1987 | Adams | 294/57 |
| 4,848,073 | 7/1989 | Germain et al. | 56/400.17 |
| 4,878,704 | 11/1989 | Jacanin, Jr. et al. | 294/54.5 |
| 4,991,324 | 2/1991 | Fine et al. | 37/284 |
| 4,993,768 | 2/1991 | Ewen | 294/51 |
| 5,228,734 | 7/1993 | Pollastro | 294/54.5 |
| 5,419,600 | 5/1995 | Tisbo et al. | 294/54.5 |
| 5,435,063 | 7/1995 | Russo | 30/164.5 |

EXPANDABLE SNOW TOOLS FOR VEHICLES

BACKGROUND OF THE INVENTION

This invention pertains to snow shovels and, more particularly, to vehicle snow tools.

Snow shovels and other snow tools are useful to help dig out vehicles after a blizzard or large accumulation of snow, or when a vehicle gets stuck in snow. It is useful to carry snow shovels or other snow tools in vehicles. Unfortunately, many snow tools are large, bulky, take up valuable storage space, and do not readily fit in compact cars, sport utility vehicles, convertibles, and automobiles with small trunks.

Handheld portable snow tools, typically referred to as manual snow tools, are useful to remove snow, ice and slush from sidewalks and driveways. Over the years, various types of manual snow tools have been developed, such as snow shovels, pushers and scrapers. In the past, manual snow tools were constructed with a wooden handle and a steel or iron blade or scoop. Conventional snow tools are often heavy, awkward, and cumbersome to use. In an effort to improve the ease of use and decrease the weight of snow tools, snow tools have been made with aluminum handles and/or aluminum blades. Aluminum handles can be very slippery and difficult to hold when wet, such as when it snows or sleets. In modern times, part of the snow tools have been fabricated of plastic. Early snow tools with plastic blades were somewhat flimsy and did not wear well. Furthermore, snow tools with smooth, plastic rounded handles can also be slippery and difficult to hold when wet.

Small amounts of snow can be readily removed from sidewalks, stairs and driveways with a snow shovel. Snow shovels are good all around snow tools. Typically, snow shovels have a generally flat blade with a very slight curvature. Snow shovels are useful to shovel, lift, raise and throw light snow away from the sidewalk, stairs or driveway. If the snow is deep, heavy, or slushy, other types of snow tools are better, safer and more productive than standard snow shovels. Moreover, lifting heavy snow with a standard snow shovel may cause back injuries and sometimes heart problems for some people.

Snow pushers have a rounded or curved blade which are useful to push heavy or deep snow and slush away from sidewalks and drivers. Snow pushers can be very heavy. The deep curvature of pusher blades, however, is not generally useful to lift (raise) and throw snow and slush, which remain after the bulk of the snow and slush has been pushed away. Furthermore, many snowfalls, such as 2½ inches to 5 inches of snow, are too deep to comfortably use only a snow shovel, but too shallow (not deep enough) to use only a snow pusher. Combination snow shovels and snow pushers can be useful for such purposes.

Scrapers are useful to scrape, cut and chop ice from sidewalks and driveways. Smaller scrapers are useful to scrape ice from vehicle windows and windshields. Ice can accumulate on sidewalks and driveways from ice storms or from snow which has melted during the day and freezes at night when the temperature drops. Icy sidewalks and driveways can be very dangerous and slippery. It is often difficult to walk and safely drive with full control on icy pavements. If snow falls and accumulates on the ice, the underlying layer of ice can be treacherous. Once the ice is chopped or scraped, it can be scooped, shoved and removed with a snow scoop.

The snow shovel and scoop are well known hand tools used primarily for shoveling, scooping and removing snow.

An important consideration and concern with snow shovels and scoops are the strength to weight ratio. In the past, the stronger a snow shovel and scoop, the heavier it was, due to the amount of material mass required for rigidity. The weight of conventional iron and steel snow shovel blades and scoop blades is burdensome, awkward and inconvenient, especially if the person lifting the blade is young, elderly or not trained in proper lifting techniques. If the snow shovel blade and scoop blade is made too thin, it will bend under load. Therefore, conventional prior snow shovels and scoops have been constructed of thick iron or steel which provides a heavy awkward hand tool that is hefty and burdensome to operate.

A snow shovel blade, scoop blade and ice scraper blade, are usually subjected to impact forces and abrasion during use from impacted snow, ice, the underlying pavement, salt, etc., which can pit, corrode, or otherwise damage the snow shovel blade, scoop blade and ice scraper blade. Furthermore, salt used to melt ice and water from slush and melting snow can accelerate rust and degradation of conventional iron snow shovels, scoops, and ice scrapers. These factors can cause premature failure of the snow shovel, snow scoop, and ice scraper.

A snow shovel and scoop used primarily for snow removal is unique in that the consumer seeks a large, but lightweight, large shovel blade or scoop blade. For these reasons, in place of an iron or steel blade, some snow tools are manufactured with aluminum or plastic blades. While aluminum and plastic do not rust, they are much weaker and flimsier than iron and steel and often require greater thickness or reinforcement in order to withstand the loads, forces, stress and strain of scooping, shoveling and removing snow. Without reinforcement of an aluminum blade to prevent counter-flexing, such as stepping on the back of the blade, the aluminum blade can bend in half thereby ruining the tool.

Another problem with prior snow shovels and scoops is that the conventional heavy shaft and associated handle add enormous weight and bulkiness to the snow tool. Metal handles comprising metal shafts and/or metal handgrips, made of iron and steel have been used.

In an effort to improve the ease of use and decrease the weight of snow tools, snow tools have been made with aluminum handles (shafts) and/or aluminum blades. Aluminum handles can be very slippery, cold and difficult to hold when wet, such as when it snows or sleets.

Manufacturers often try to remedy the situation by using various other types of materials. While an iron shaft is strong, it can readily corrode due to moisture, snow and sleet. Furthermore, an iron or steel shaft is very cold due to the inability to compensate for the cold surrounding ambient temperature.

It has been common practice to make the shaft of the handle from wood and to rivet a section of wood to the handgrip. However, a problem with wood is that unless properly treated, water can rot the wood especially where the parts are fastened or coupled together. While it is possible to replace the wood, it is more likely that the snow tool will be discarded.

The blade, shaft and handgrip of a shovel can also be constructed from plastic which does not rot, rust, or retain cold as its wood and metal counterparts. However, the problem with plastic is strength. Early snow tools with plastic blades were somewhat flimsy and did not wear well. A plastic shaft may flex causing the shaft to bend since the shaft becomes a fulcrum point during use. Furthermore, snow tools with smooth, rounded handles can also be slippery and difficult to hold when wet. A blade made of plastic further presents a number of problems, including control of flexing and wear.

In order to manually remove snow from around the tires of vehicles in parking lots, streets, driveways, and pavements, different amounts of effort are often required to remove the snow, depending on the depth, temperature, fluffiness, amounts of slush, water, ice and texture of the snow to be removed. Sometimes, women, children and older men may become overburdened and frustrated by the weight and bulkiness of a regular snow pusher when removing light snow. Also, regular snow pushers can be too heavy, awkward and cumbersome to shovel, lift and throw light snow for some women, children, and older men. On the other hand, conventional flat snow shovels are usually too large to store in compact cars, sport utility vehicles, convertibles and automobiles with small trunks.

It is therefore, desirable to develop an improved snow tool for vehicles which overcomes most, if not all, of the preceding problems.

SUMMARY OF THE INVENTION

An improved, expandable snow removal tool is provided which readily fits in trunks of automobiles, sport utility vehicles, station wagons, vans, trucks, and other vehicles. Advantageously, the vehicle snow tool is compact, sturdy, and strong. Desirably, the novel vehicle snow tool is comfortable, safer and convenient. The expandable snow tool is also easier to use and store in vehicles than conventional full size snow shovels, heavy snow pushers, and many other conventional snow tools. Furthermore, the novel vehicle snow tool is dependable and more desirable than conventional automobile snow shovels.

The user-friendly vehicle snow tool has a blade assembly to shovel, push or scrape snow and/or ice. The improved vehicle snow tool also has a special expandable handle assembly to securely maneuver, push and lift the blade assembly. The handle assembly has a handgrip and an expandable and retractable handle comprising telescoping shafts or shanks. The handle extends between and is secured to the handgrip and blade assembly. A connector assembly, such as a snap lock assembly, releasably secures the telescoping shafts in an expanded shoveling position and in a retracted storage position.

Desirably, at least one of the telescoping shafts comprises an outer composite shaft (shank) comprising a plastic sleeve which annularly thermally insulates and substantially covers the entire length of an interior metal tube (core). The other telescoping shaft provides an inner shaft (shank) which can comprise a tubular metal shaft (shank), that is preferably covered with a protective coating, such as paint. The inner shaft can also be plated or anodized. Advantageously, the inner shaft has a maximum outside diameter that is less than the inside diameter of the outer shaft so that the inner shaft can slide within the outer shaft from a retracted position to an expanded position and vice versa. One of the shafts is connected to the blade assembly, while the other shaft is connected to the handgrip.

In the preferred form, the blade assembly comprises a plastic snow shovel blade with curved ribs. Other types of blades can be used, such as: a snow pusher blade, a combination snow shovel and pusher blade, a snow scoop blade, an ice chopper blade, or an ice scraper blade. Plastic blades can have a metal wear strip secured to its front or leading edge. In some circumstances, it may be desirable to use a metal blade or a blade with straight ribs or no ribs.

In order to better grip and readily minimize slippage of the vehicle snow tool, the vehicle snow tool can have a ribbed expandable handle assembly. The comfortable readily graspable handle assembly is operatively associated with the snow blade to better and more easily maneuver the snow tool and blade. The expandable handle assembly can have ribs or furrows, and can comprise an extruded handle with fluting. The expandable extruded handle can include one or more telescoping extruded fluted tubes, shaft or shanks with ridges that extend towards the blade. Desirably, at least one of the shaft (shanks) has a metal core positioned within a plastic sleeve. The metal core can be a steel, iron or aluminum pipe. The plastic sleeve can have finger-gripping portions such as knurling, protuberances, or finger-gripping grooves, which extend substantially parallel to the axis of the sleeve and handle towards the blade.

In the illustrative embodiment, the handgrip comprises a comfortable D-shaped plastic handgrip with finger grippable ribs. The handgrip can have a textured surface as well as raised flanges to enhance the structural strength and integrity of the handgrip.

A more detailed explanation of the invention is provided in the following description and appended claims taken in conjunction with the accompanying claims.

DETAILED DESCRIPTION OF THE PREFERRED EMBODIMENTS

Figure 1:
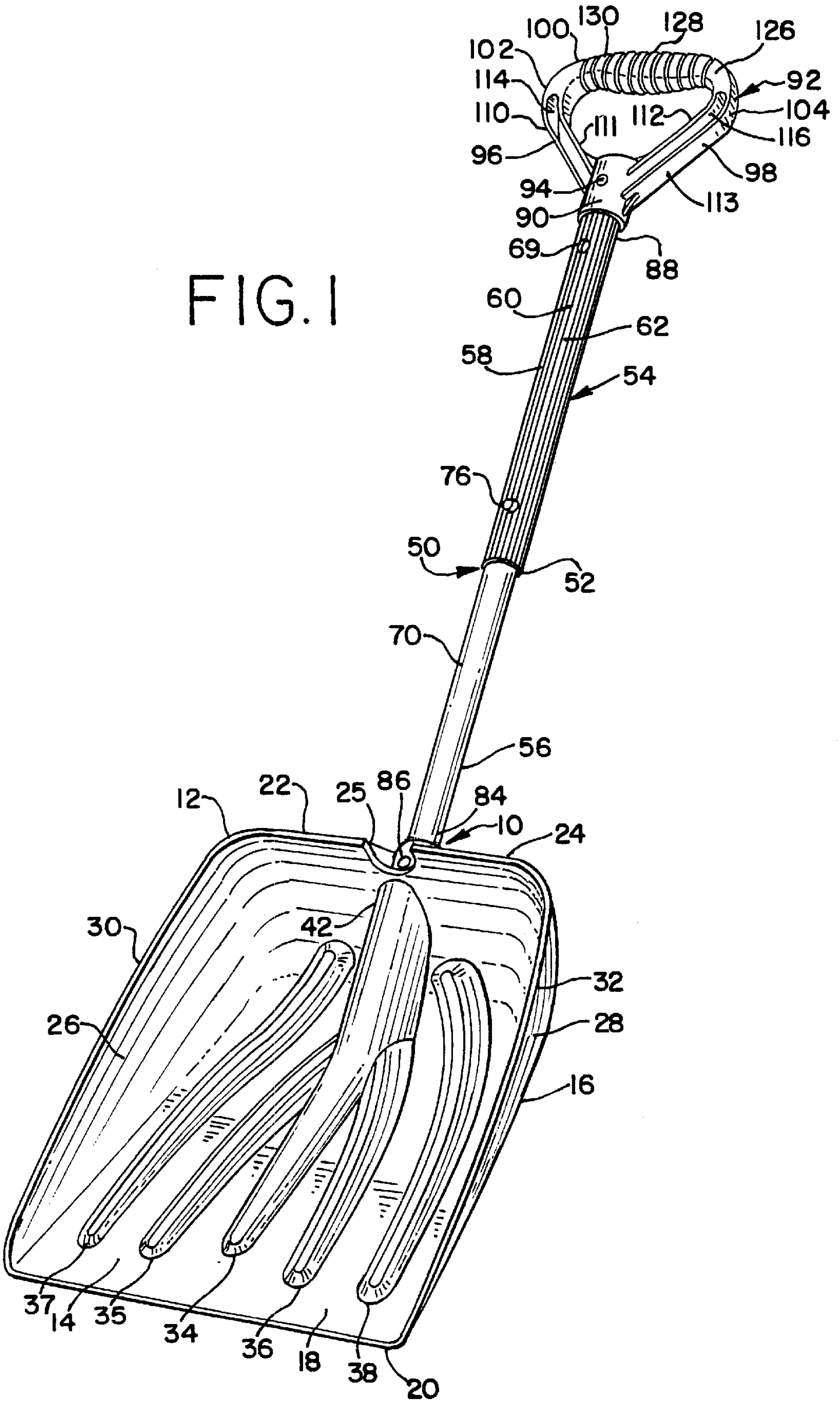
FIG. 1 is a perspective view of an expandable telescoping snow tool in accordance with principles of the present invention.
Figures 2, 3, 4:
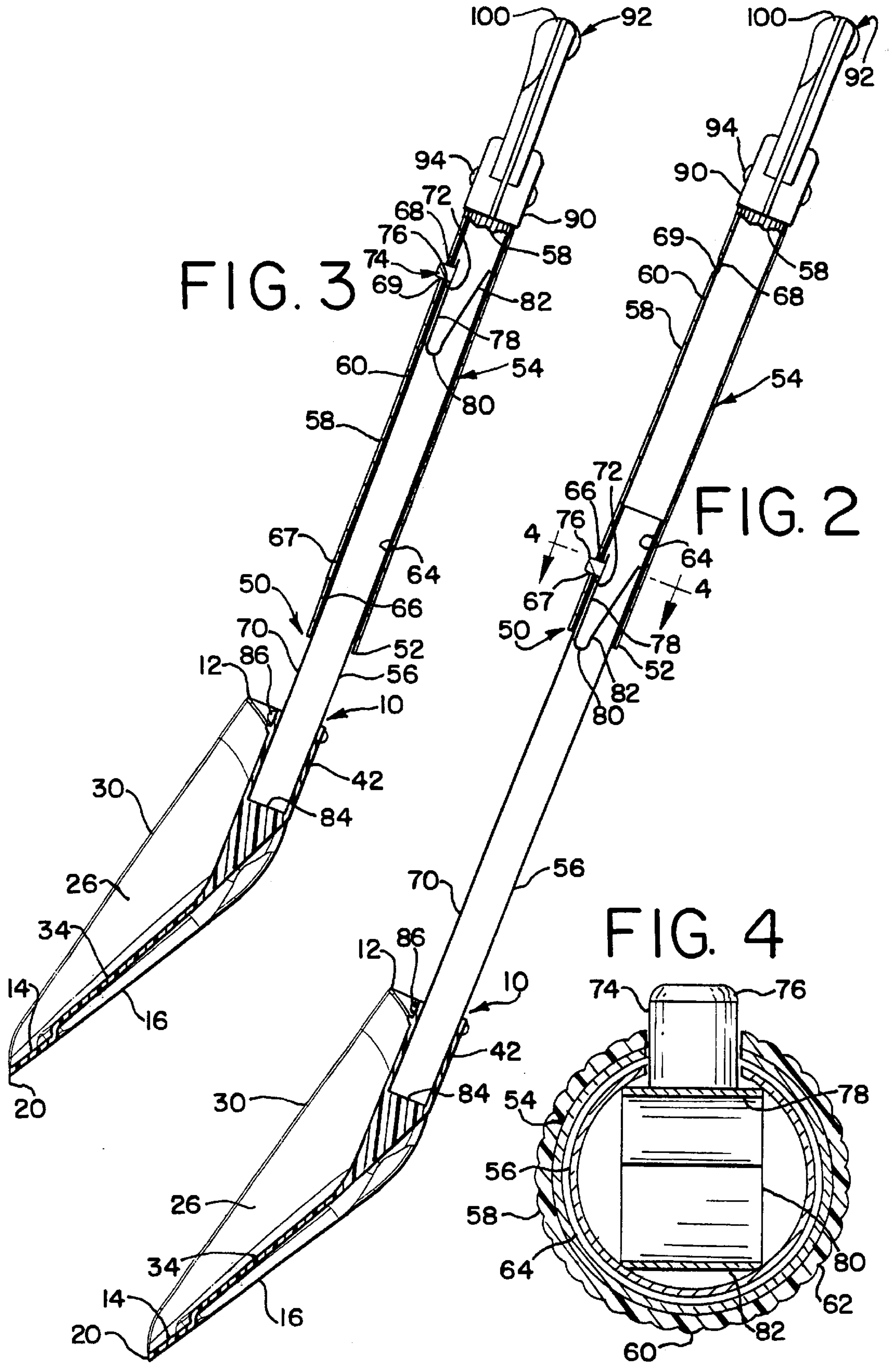
FIG. 2 is a cross-sectional view of the expandable telescoping snow tool in an expanded position.
FIG. 3 is a cross-sectional view of the expandable telescoping snow tool in a retracted position.
FIG. 4 is a greatly enlarged cross-sectional view of the expandable telescoping snow tool taken substantially along line 4—4 of FIG. 2.

An expandable, telescoping, handheld, manual, portable, retractable and collapsible snow removal tool 10 is provided. Advantageously, the snow tool can be telescoped and expanded as shown in FIGS. 1 and 2, to manually push, shovel, lift, raise and remove snow from around the tires of vehicles in parking lots, streets, pavements, curbs, and from other places. Desirably, the snow tool can be retracted and compressed as shown in FIG. 3, to a compact retracted storage position for storage and placement in trunks of automobiles or in sport utility vehicles, station wagons, vans, trucks, convertibles or other vehicles.

The expandable snow tool can have a snow shovel blade 12 (FIG. 1) fabricated of impact-resistant plastic, such as polypropylene, or graphite-impregnated plastic. The snow shovel blade has a front blade surface 14 to push, engage, pickup and lift snow and has a back (rear) blade surface 16 which supports the front surface. The snow shovel blade has a lower portion 18 providing a leading edge or front edge 20 and has an upper portion 22 providing a trailing edge or back edge 24. The upper portion can have a cutaway section that provides a notch or U-shaped opening 25 along the centerline of the blade to facilitate nesting, stacking, and storage of similar blades. The snow blade also has sidewalls 26 and 28 which extend between and are integrally connected to the upper and lower portions of the blade. The curved sidewalls have upper edges 30 and 32. The sidewalls help contain, scoop and collect the snow on the front blade surface during shoveling, pushing and lifting of the snow tool.

The snow shovel blade further has inverted V-shaped bifurcated ribs or ridges 34–38 (FIG. 1) also referred to as reinforced ribs or curved reinforcement ribs. The inverted V-shaped ridges comprising the ribs of the blade project integrally outwardly (forwardly) of the front blade surface and extend between the lower and upper portions to enhance the structural strength and integrity of the snow shovel blade. The blade's ribs are generally V-shaped as viewed from the back surface of the blade. Preferably, the ribs include curved flared ribs 35–38 which converge laterally inwardly away from the blade's sidewalls and toward the axis of the handle and centerline of the blade in a direction towards the blade's upper portion. The blade's ribs facilitate pushing, shoveling and channeling of the snow towards the back edge of the upper portion of the blade's front surface. The blade's ribs also help prevent the channeled snow from falling off the leading edge of the blade. Desirably, the blade's angled ribs throw and push more snow forward creating a powerful snowplow effect.

The blade's ribs include: a center rib 34, inboard ribs 35 and 36, and outboard ribs 37 and 38. The ribs can have rounded apexes. The inboard ribs converge towards and are integrally connected to an intermediate portion of the blade's center rib. The outboard ribs are spaced between the sidewalls and the inboard ribs and curve inwardly towards the back edge of the blade's front surface. The center rib extends along the centerline of the blade and in alignment with the axis of the handle (handle assembly).

The upper portion of the center rib is deeper than the lower portion of the center rib and forms a socket 42 (FIG. 1), which provides a coupler or shaft coupling, to snugly receive the lower end of the lower inner shaft of the handle. The socket (coupler) of the blade extends integrally downwardly from the blade's back surface.

The back of the snow blade can have a center flange, which provides a tab or back rib, that extends integrally downwardly from the center rib and back surface of the blade. The center flange can extend along the centerline of the center rib and blade. A short transverse flange can provide a lateral tab or transverse rib which extends integrally downwardly from the center rib and the blade's back surface. The transverse flange can intersect the center flange and can extend between and connect the centerlines of the inboard ribs. The transverse flange can be much shorter than the center flange. The flanges can further enhance the structural strength of the snow blade.

If desired, the back surface of the leading edge of lower portion of the back surface of the blade can have a recessed rivet pocket to snugly receive a metal wear strip, which is also referred to as a wear-resistant strip, metal, skid, protector or reinforcement strip, to protect the leading edge of the blade and enhance the longevity and useful life of the blade. The wear strip can be made of stainless steel, galvanized steel, carbon steel, iron and its alloys, or other metal. The wear strip can be connected to the seat along a recessed rivet pocket by rivets or other fasteners. The recessed rivet pocket allows shoveling and scraping to occur without wearing the heads of the rivets. The snow shovel is designed and arranged for strength, longevity and durability, with or without wear strips.

An expandable composite handle assembly 50 (FIG. 1) has a telescoping, expandable and retractable composite handle 52 to better grip the snow tool and maneuver, push, shovel and lift the snow shovel blade. The handle is preferably straight and comprises telescoping, expandable and retractable, elongated, manually grippable shafts or shanks 54 and 56 including an outer upper composite shaft (shank) 54 and an inner lower shaft (shank) 56. The outer shaft provides a ribbed fluted upper handle portion. The outer composite shaft includes a ribbed, plastic, resin, axially (longitudinally) lined sleeve 58 comprising an extruded fluted tube or sheath of impact-resistant plastic, such as polypropylene, polyethylene, or polyvinyl chloride. In order to enhance gripping, the fluted tube has elongated aliquotly and circumferentially spaced, parallel ribs 60 which provide longitudinally, raised, rounded convex, finger-gripping pads or ridges in the axial direction. The ribs of the tubular sleeves are separated by elongated grooves 62 which provide finger-gripping slots or slits that extend parallel to the axis of the shaft and towards the blade and handgrip. The grooves provide parallel fluting or furrows which can extend along the entire length of the exterior surface of the outer shaft to further enhance gripping of the snow tool. The sleeve can have 36 circumferential ribs and flutes (fluting) which cooperate with each other to provide convex pads. Each rib of the sleeve is rounded and can extend for 10 degrees. The tube can be semi-rigid, yet flexible to withstand impact forces, bending and torque associated with shoving, pushing, scraping and throwing snow.

In order to improve the structural strength, bending resistance, torsion and torque capacity of the outer composite shaft of the upper handle portion, an interior metal core 64 (FIGS. 2–4) is snugly positioned and press fit within the exterior plastic sleeve. In the preferred embodiment, the metal core and sleeve are the same length. The inner metal core is preferably hollow and tubular to decrease the weight of the upper handle portion and can comprise a steel tube or a metal pipe made of steel, iron, aluminum or other metal. The ribbed plastic sleeve provides a protective cover which annularly surrounds, encircles, and thermally insulates the metal core. The plastic sleeving overcoats and shrink fits the steel tube. The outer composite shaft has pushbutton-receiving apertures or holes 66–69 including lower aligned apertures 66 and 67 (FIG. 2) which extend through the sleeve and core in proximity to the lower end portion of the outer composite shaft and upper aligned apertures 68 and 69 (FIG. 3) which extend through the sleeve and core in proximity to the handgrip and upper end portion of the outer composite shaft.

The inner shaft 56 (FIG. 1) provides a lower handle portion and preferably comprises a metal tube or pipe made of steel, iron, aluminum or other metal. The inner shaft comprises a lower tubular metal shank and has a maximum outside diameter less than the minimum inside diameter of the metal core of the outer composite shaft of the upper handle portion so that the inner shaft of the lower handle portion can telescopically engage and slide within the metal core of the upper handle portion.

The inner shaft can have a protective outer coating 70, preferably opaque paint. In some circumstances, it may be desirable to use other types of coatings or a plastic sleeve, similar to the plastic sleeve of the upper outer composite shaft. The inner shaft has a pushbutton-receiving aperture or hole 72 (FIGS. 2 and 3) in proximity to its upper inner end portion.

A connector assembly preferably comprising snap lock assembly 74 (FIGS. 2–4) with a manually depressible spring-biased pushbutton 76 provides a snap button. The pushbutton is cantilevered and integrally connected to one diverging end 78 of an articulated, generally U-shaped leaf spring 80. The other diverging end 82 of the leaf spring is wedged against, welded or otherwise securely fixed and connected to the interior surface of the inner shaft in proximity to its upper end portion. The pushbutton and leaf spring can be made of plastic but are preferably made of metal. The pushbutton snap fits, is inserted and extends through the pushbutton-receiving aperture of the inner shaft. The pushbutton also snap-fittingly engages and extends through the upper apertures of the outer composite shaft to securely connect, interlockingly engage and firmly lock the inner and outer shafts of the handle in the retracted position as shown in FIG. 3. The pushbutton further snap-fittingly engages and extends through the lower apertures of the outer composite shaft to securely connect, interlockingly engage and firmly lock the inner and outer shafts of the telescoping handle in the expanded position as shown in FIG. 2.

The lower blade-connecting end portion 84 (FIGS. 1–3) of the inner shaft of the lower handle portion telescopically fits and is positioned within and is coupled to the female socket (coupling) of the blade. The blade coupling (socket) closes and seals the lower blade-connecting end of the tubular handle. One or more screws 86, rivets, or other fasteners can securely connect and fasten the lower end portion of the inner shaft to the blade coupling.

The upper handgrip-connecting male end 88 (FIG. 1) of the outer composite shaft of the upper handle portion is positioned within and is coupled to a female socket 90 of a ribbed, D-Shaped, plastic ergonomic handgrip 92. The female socket, which is also referred to as a handgrip coupling, provides a cap which covers and closes the upper end portion of the outer composite shaft. One or more screws 94, rivets, or other fasteners can securely connect and fasten the upper handgrip-connecting end of the outer composite shaft of the upper handle portion to the handgrip coupling (socket).

The handgrip is specially shaped, arranged and constructed to further enhance gripping of the snow tool and facilitate moving, pushing, shoveling, lifting, control and maneuvering of the blade and snow tool. The handgrip is connected to the upper end portion of the outer composite shaft of the upper handle portion at a location longitudinally (axially) opposite and spaced away from the blade. The handgrip is preferably molded of impact-resistant plastic, such as polyethylene or polypropylene. The handgrip can have bifurcated, V-shaped, flared, spread and slanted sides 96 and 98 (FIG. 1) which converge toward the upper end portion of the outer composite shaft and are integrally connected to the sides of the handgrip coupling (socket).

A manually grippable crossbar 100 provides a bight (FIG. 1) that extends transversely across, laterally between and is integrally connected to the sides of the handgrip. The crossbar (bight) closes the upper diverging end of the spread sides of the D-shaped handgrip. Preferably, the crossbar and sides intersect each other with rounded finger-engageable comers 102 and 104. The comers are curved to comfortably receive the thumb of the user's hand to further facilitate gripping of the snow tool.

Figure 5:
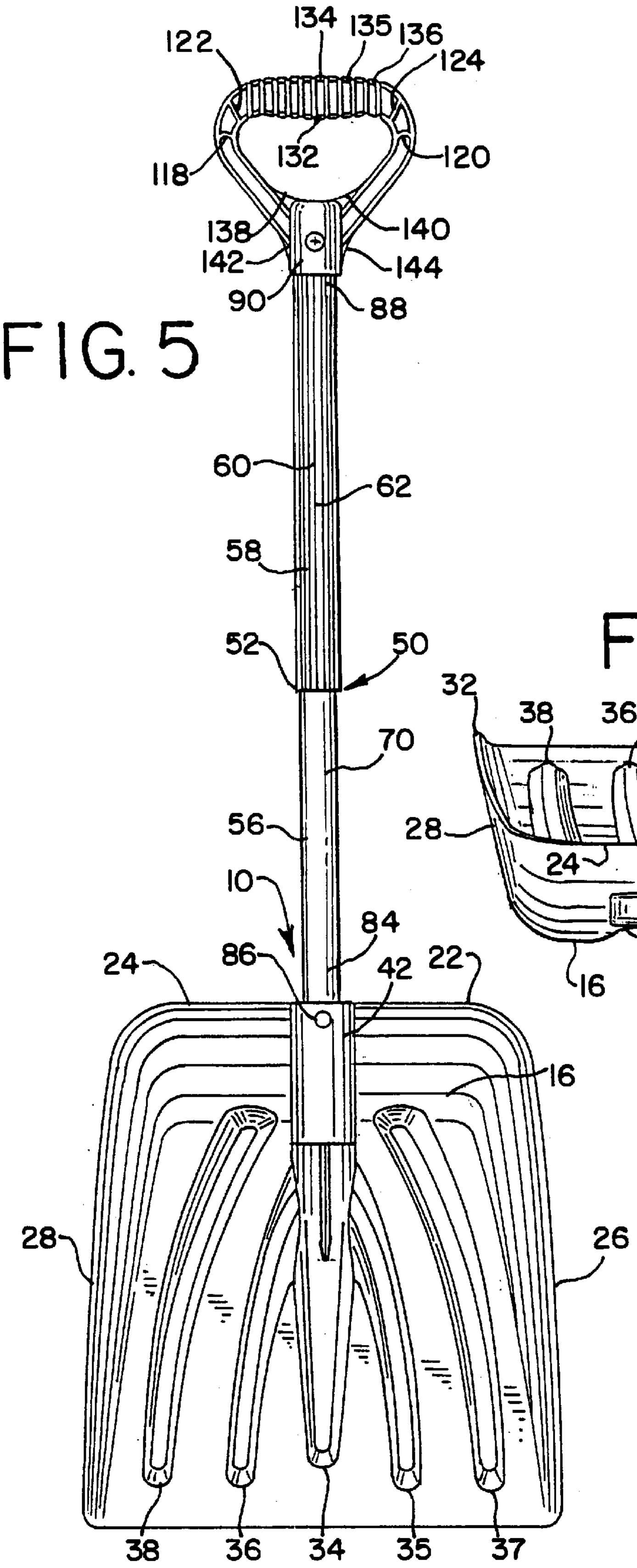
FIG. 5 is a back view of the expandable telescoping snow tool.
Figure 6:
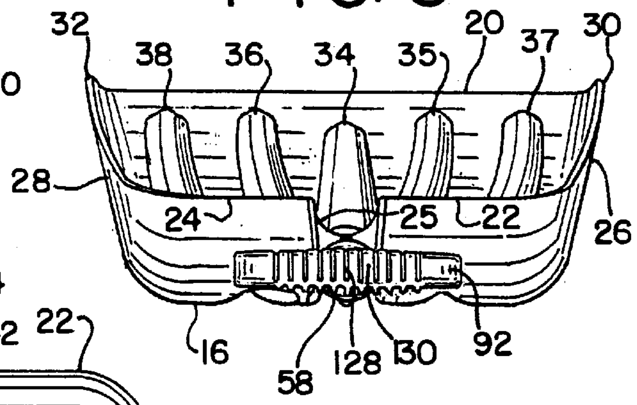
FIG. 6 is a top view of the expandable telescoping snow tool.

The sides of the handgrip have raised flanges 110–113 (FIG. 1) comprising inner and outer converging ribs to enhance the structural strength of the handgrip. Each of the sides has a pair of parallel flanges which extend integrally upwardly and downwardly from and are separated by flat or planar pads 114 and 116. The pads are spaced between and are integrally connected to the flanges. The pads and flanges cooperate with each other to provide further gripping surfaces. As shown in FIG. 5, the back of the handgrip can have inner curved webs 138 and 140 which provide interior, arcuate, lateral ribs that extend between and integrally connect the inner flanges of the sides to the cap (socket) of the handgrip. The back of the handgrip can also have outer curved webs which provide exterior, arcuate, lateral ribs 142 and 144 that extend between and integrally connect the outer flanges of the sides to the cap (socket) of the handgrip.

The crossbar (bight) of the handgrip has a manually grippable portion comprising a textured convex upper surface 126 (FIG. 1) with an array, series or set of raised convex, textured, finger-gripping pads 128 that provide curved arcuate ridges. The ridges (finger-gripping pads) are separated by aliquotly, uniformly spaced, convex, arcuate parallel grooves 130. The textured surface, ridges (finger-gripping pads), and grooves cooperate with each other to facilitate gripping of the handgrip. The front inner face of the crossbar can provide a finger-gripping front surface which can be slightly convex in the crosswise (lateral) direction and can have a bulging, rounded intermediate section which complements the curvature of the user's curled fingers when grasping the handgrip to further facilitate gripping of the handgrip and snow tool.

As shown in FIG. 5, the manually grippable portion (crossbar) of the handgrip can have a ribbed convex lower surface 132 which extends integrally downwardly from the textured upper surface. The ribbed lower surface can have aliquotly, uniformly spaced, rounded, finger-gripping ribs 134–136 comprising parallel convex disc sections which depend (extend) integrally downwardly from the textured upper surface to further facilitate gripping of the bight (crossbar) and snow tool. The center and intermediate disc sections (ribs) 134 and 135 can be larger and extend downwardly a greater distance than the other disc sections (end ribs) 136. Furthermore, the disc sections can have an overall convex profile in the crosswise (lateral) direction which is complementary to the palm of the user's hand to comfortably fit in to the palm of the user's hand. The disc sections further facilitate gripping of the handgrip and pushing, shoveling and grasping of the snow tool. The handgrip can also have convex curved ribs 118 and 120 and flared rearwardly diverging ribs 122 and 124, which extend between and integrally connect the bottom flange of the handgrip's sides about the rounded corners of the handgrip to further enhance the structural strength of the handgrip. The upper and lower portions of the handgrip can be integrally connected along a mold parting line or flange.

As previously described, the snow tool has a blade assembly with an upwardly extending socket which provides a lower coupling joint and has a set of symmetrical downwardly diverging plastic reinforcement ribs which extend laterally outwardly of the upwardly extending socket. The blade assembly comprises a blade with a leading edge. The blade can be a snow shovel blade. Advantageously, the snow tool has an expandable telescoping composite handle assembly to maneuver the blade assembly and blade. The composite handle assembly has a plastic generally D-shaped handgrip with a downwardly extending socket which provides an upper coupling joint that extends along an upright vertical axis and is aligned in registration with the lower coupling joint of the blade assembly. The handgrip has flared sides which converge towards and are integrally connected to the handgrip's downwardly extending socket (upper coupling joint). The handgrip has a bight comprising a manually grippable crossbar that extends between and is integrally connected to the flared sides of the handgrip above the handgrip's upper coupling joint. The crossbar extends along a horizontal axis and is positioned perpendicular to the vertical upright axis of the downwardly extending socket (upper coupling joint). The handgrip can be molded of impact-resistant plastic, such as: polyethylene, polypropylene, graphite-impregnated plastic, or polyvinyl chloride.

As discussed above, the composite handle assembly has an elongated telescoping handle which extends along a longitudinal vertical upright axis between the handgrip and the blade assembly and is positioned in a coaxial alignment with the upper coupling joint and upright axis of the handgrip. The upper end portion of the handle is positioned within and securely fixed to the upper coupling joint of the handgrip. The lower end portion of the handle is positioned within and securely fixed to the lower coupling joint of the blade assembly.

The upper handle portion comprises an outer composite shaft (shank) The composite shaft comprises a manually grippable plastic sleeve which completely annularly surrounds and thermally insulates an interior metal core. The sleeve and core can be of the same length. The metal core is constructed of a rigid tube of metal, such as iron, aluminum and preferably steel. The sleeve can comprise an extruded tube of impact-resistant plastic, such as: polyethylene, polypropylene, graphite-impregnated plastic, or polyvinyl chloride. The lower handle portion comprises an inner shaft (shank) with a protective outer coating. The inner shaft can be a rigid metal tube constructed of steel, iron or aluminum.

A snap lock connector assembly is provided to snap fit, releasably secure, interlockingly engage and detachably lock the lower handle portion to the upper handle portion in the retracted and expanded positions. Preferably, the snap lock connector assembly comprises a manually depressible spring-biased pushbutton. The pushbutton is normally biased and urged to extend outwardly through the pushbutton-receiving apertures of the inner and outer shafts of the handle in the expanded and retracted positions. The pushbutton can be depressed inwardly below the exterior surface of the inner shaft to unlock the snap lock connector assembly and permit the inner and outer shafts to slide, telescope, expand and retract.

Among the many advantages of the telescoping expandable vehicle snow tools of this invention are:

1. Outstanding performance.
2. Easily retracts and expands.
3. Thermally insulates the handle.
4. Helps prevent the handle from rusting.
5. Firmly locks the handle in the expanded and retracted positions.
6. Superb ability to shovel, lift and throw snow around the tires of vehicles.
7. Excellent snow removal.
8. Compact.
9. Attractive.
10. Safe.
11. Dependable.
12. User-friendly.
13. Convenient.
14. Durable.
15. Portable.
16. Light-weight.
17. Comfortable.
18. Simple to use.
19. Efficient.
20. Versatile.
21. Economical.
22. Effective.

Although embodiments of the invention have been shown and described, it is to be understood that various modifications and substitutions, as well as rearrangements of parts, components, and process steps, can be made by those skilled in the art without departing from the novel spirit and scope of this invention.

What is claimed is:

1. An expandable snow tool, comprising:
a blade assembly for shoveling, pushing, or scraping snow;
an expandable handle assembly comprising
a handgrip;
an expandable handle extending between and secured to said handgrip and said blade assembly, said expandable handle comprising telescoping shafts, said telescoping shafts being moveable from a retracted position to an expanded position;
a connector assembly for securing said telescoping shafts in said retracted position and in said expanded position; and
at least one of said telescoping shafts comprising a composite shaft comprising
a metal tube; and
a plastic sleeve annularly surrounding and covering substantially the entire length of said metal tube.

2. An expandable snow tool in accordance with claim 1 wherein said blade assembly comprises a plastic shovel blade.

3. An expandable snow tool in accordance with claim 1 wherein said handgrip comprises a generally D-shaped handgrip.

4. An expandable snow tool in accordance with claim 1 wherein said connector assembly comprises a snap lock assembly.

5. An expandable snow tool in accordance with claim 1 including a protective coating covering at least one of said telescoping shafts.

6. An expandable snow tool in accordance with claim 5 wherein said protective coating comprises paint.

7. An expandable snow tool, comprising:
a blade assembly
a plastic generally D-shaped handgrip;
a retractable handle positioned between said handgrip and said blade assembly,
said retractable handle comprising an outer composite shank and an inner shank, one of said shanks being connected to said blade assembly, and the other of said shanks being connected to said handgrip;
said outer composite shank comprising
a metal tube having an inside diameter; and
a plastic sleeve thermally insulating and positioned about said metal tube;
said inner shank having a maximum diameter less than the inside diameter of said metal tube for sliding within said metal tube from a retracted storage position to an expanded shoveling position; and
a snap lock assembly for releasably connecting said shanks in said retracted storage position and in said expanded shoveling position.

8. An expandable snow tool in accordance with claim 7 wherein said blade assembly has curved ribs.

9. An expandable snow tool in accordance with claim 7 wherein said plastic sleeve comprised a ribbed plastic sleeve with substantially parallel ridges extending along the length of said sleeve.

10. An expandable snow tool in accordance with claim 7 wherein said snap lock assembly comprises a pushbutton assembly.

11. An expandable snow tool in accordance with claim 7 wherein said inner shank comprises a tubular metal shank.

12. An expandable snow tool in accordance with claim 11 wherein said tubular metal shank has an outer painted coating.

13. An expandable snow tool, comprising:

a blade assembly for shoveling, pushing or scraping snow, said blade assembly defining an upwardly extending socket providing a plastic lower coupling joint and having a set of symmetrical downwardly diverging plastic reinforcement ribs extending laterally outwardly of said upwardly extending socket, said blade assembly comprising a blade having a leading edge;

an expandable composite handle assembly for maneuvering said blade assembly, comprising a plastic generally D-shaped handgrip defining a downwardly extending socket providing an upper coupling joint along an upright axis, said handgrip having flared sides converging towards and integrally connected to said downwardly extending socket providing said upper coupling joint, said handgrip having a bight comprising a manually grippable crossbar extending between and integrally connecting said flared sides above said upper coupling joint, said crossbar extending along a substantially horizontal axis positioned substantially perpendicular to said upright axis of said downwardly extending socket providing said upper coupling joint of said handgrip, and said handgrip comprising plastic selected from the group consisting of polyethylene, polypropylene, graphite-impregnated plastic, and polyvinyl chloride;

an elongated expandable handle extending along a longitudinal axis between said handgrip and said blade assembly in coaxial alignment with said upright axis of said handgrip, said expandable handle comprising an outer composite shank providing a manually grippable upper shaft, said outer composite shank having an upper end positioned within and fixedly secured to said upper coupling joint of said handgrip, and said expandable handle comprising an inner shank providing a manually grippable lower shaft having a lower end positioned within said lower coupling joint of said blade assembly;

said outer composite shank defining aligned upper apertures and aligned lower apertures, said outer composite shank comprising a metal core and an impact resistant plastic sleeve thermally insulating and annularly surrounding said metal core, said metal core and said plastic sleeve being of similar lengths;

said metal core being completely positioned within and fixedly secured to said plastic sleeve, said metal core comprising a metal tube with an inside diameter, said metal tube comprising a metal selected from the group consisting of steel, iron and aluminum;

said plastic sleeve comprising an extruded plastic tube, said extruded plastic tube comprising a plastic selected from the group consisting of polyethylene, polypropylene, graphite-impregnated plastic, and polyvinyl chloride;

said inner shank comprising a tubular metal shank having a maximum diameter less than the inside diameter of said metal core for telescopically engaging and sliding within said metal core of said outer composite shank from a retracted position during storage of the snow tool to an expanded position for shoveling, pushing or scraping snow, said tubular metal shank comprising a metal selected from the group consisting of steel, iron and aluminum;

said inner shank having an upper inner end with a pushbutton-receiving upper aperture;

a snap lock assembly comprising a manually depressible spring-biased pushbutton connected to said upper inner end of said inner shank, said pushbutton extending through said pushbutton-receiving aperture of said inner shank, said pushbutton snap-fittingly engaging and extending through said upper apertures of said outer composite shank for securely connecting and locking said shanks of said handle in said retracted position, and said pushbutton snap-fittingly engaging and extending through said lower apertures of said outer composite shank for securely connecting and locking said shanks of said handle in said expanded position.

14. An expandable tool in accordance with claim 13 wherein said tubular metal shank has an exterior surface with a painted protective coating.

15. An expandable snow tool in accordance with claim 13 wherein:

said flared sides of said handgrip have raised flanges comprising inner and outer converging ribs for enhancing the structural length of said handgrip; and said manually grippable crossbar of said handgrip has a textured convex upper surface with an array of raised convex textured pads separated by aliquotly spaced arcuate grooves for facilitating gripping of said handgrip.

16. An expandable snow tool in accordance with claim 13 wherein said blade comprises a plastic blade, said plastic blade comprises a plastic selected from the group consisting of polyethylene, polypropylene, graphite-impregnated plastic, and polyvinyl chloride, and said plastic blade providing said lower coupling joint and said reinforcement ribs.

17. A snow tool in accordance with claim 16 wherein said plastic blade comprises a plastic snow shovel blade.

18. An expandable snow tool in accordance with claim 13 wherein said plastic sleeve has elongated ribs comprising convex finger-gripping pads.

19. An expandable snow tool in accordance with claim 18 wherein said plastic sleeve defines a set of grooves positioned between said ribs, said grooves extending substantially along the entire length of said sleeve and being substantially parallel to the longitudinal axis of said expandable handle.

20. An expandable snow tool in accordance with claim 13 wherein said upper and lower apertures extend through said plastic sleeve and are in longitudinal alignment.

* * * * *